United States Patent
Sasikumar (10) Patent No.: US 9,459,989 B2
(45) Date of Patent: Oct. 4, 2016

(54) METHOD AND APPARATUS FOR REVERSE DEBUGGING SOURCE CODE USING CAUSAL ANALYSIS

(75) Inventor: Anirudh Sasikumar, Bangalore (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 604 days.

(21) Appl. No.: 13/558,530

(22) Filed: Jul. 26, 2012

(65) Prior Publication Data

US 2014/0033178 A1    Jan. 30, 2014

(51) Int. Cl.
*G06F 11/36* (2006.01)

(52) U.S. Cl.
CPC ........ *G06F 11/3628* (2013.01); *G06F 11/3636* (2013.01); *G06F 11/3644* (2013.01); *G06F 11/3656* (2013.01)

(58) Field of Classification Search
CPC .......... G06F 11/3628; G06F 11/3644; G06F 11/3636; G06F 11/3656
See application file for complete search history.

(56) References Cited

U.S. PATENT DOCUMENTS

| | | | | |
|---|---|---|---|---|
| 7,225,432 B2* | 5/2007 | Jentsch et al. | ................ | 717/129 |
| 7,225,433 B2* | 5/2007 | Jentsch et al. | ................ | 717/129 |
| 7,484,203 B2* | 1/2009 | Drake | ............ | 717/126 |
| 7,836,430 B2* | 11/2010 | Shebs | ............ | 717/124 |
| 2002/0174416 A1* | 11/2002 | Bates et al. | .................... | 717/128 |
| 2008/0046699 A1* | 2/2008 | Pauw | .................. | G06F 11/3636 712/227 |
| 2012/0089965 A1* | 4/2012 | Batthish et al. | .............. | 717/125 |
| 2013/0179863 A1* | 7/2013 | Vangala et al. | ............... | 717/124 |

* cited by examiner

*Primary Examiner* — Lewis A Bullock, Jr.
*Assistant Examiner* — Tina Huynh
(74) *Attorney, Agent, or Firm* — Keller Jolley Preece (57) ABSTRACT

A method and apparatus for reverse debugging source code using causal analysis is disclosed. The method comprises executing byte-code created from a plurality of lines of source code, wherein the plurality of lines of source code comprise at least one breakpoint; storing execution data after execution of each line of source code in the plurality of lines of source code until execution reaches the at least one breakpoint; performing a code execution analysis using the execution data and the plurality of lines of source code; receiving an input via a graphical user interface (GUI), wherein the input requests specific execution details based on the code execution analysis; and responding via the GUI to the input.

20 Claims, 5 Drawing Sheets

METHOD AND APPARATUS FOR REVERSE DEBUGGING SOURCE CODE USING CAUSAL ANALYSIS

BACKGROUND OF THE INVENTION

1. Field of the Invention

Embodiments of the present invention generally relate to debugging source code and, more particularly, to a method and apparatus for reverse debugging source code using causal analysis.

2. Description of the Related Art

When debugging source code, software developers often struggle to determine how execution of a program reached a particular line of code. A stack contains information about the execution of a program at a certain point in time. A stack frame is a storage area in the stack that contains subroutine state information. Specifically, each stack frame corresponds to a call to a subroutine that has not yet terminated with a return. The stack frame at the top of the stack is for a currently executing routine and typically includes arguments passed to the routine (if any), a return address back to the routine that called this routine, and space for local variables of the routine.

Currently, developers manually put trace statements into source code that can print information that describes the state of a variable or the location of the execution. For example, a trace statement may be "Print: Line 5, x=", value of x". This trace statement can tell the developer the value of x after the execution of line 5, to assist the developer in the debugging process. Manually determining the actual path of execution followed by a portion of source code that gave rise to a bug requires a considerable amount of time. A developer may also salvage information from a stack trace to assist in the debugging process. A stack trace is a report of the active stack frames at a certain point in time during the execution of a program. A stack trace allows a developer to trace a sequence of nested functions called up to the point where the stack trace was generated. However, only currently executing routine and subroutine information can be retrieved in a stack trace. A stack trace does not provide a complete path to reveal the execution path from the beginning of program execution. Hence, understanding change in control and values of variables during execution of source code for debugging remains a challenge for developers.

Therefore, there is a need in the art for a method and apparatus for reverse debugging of source code using causal analysis.

SUMMARY OF THE INVENTION

Embodiments of the present invention provide a method and apparatus for reverse debugging source code using causal analysis. In one embodiment, the method comprises executing byte-code created from a plurality of lines of source code, wherein the plurality of lines of source code comprise at least one breakpoint. The method stores execution data after execution of each line of source code in the plurality of lines of source code until execution reaches the at least one breakpoint. The method then performs a code execution analysis using the execution data and the plurality of lines of source code. Upon receiving an input via a graphical user interface (GUI), wherein the input requests specific details of the execution based on the code execution analysis, the method responds to the input.

While the method and apparatus for reverse debugging source code using causal analysis is described herein by way of example for several embodiments and illustrative drawings, those skilled in the art will recognize that the method and apparatus for reverse debugging with causal analysis are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for reverse debugging with causal analysis as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for reverse debugging source code using causal analysis. Embodiments of the invention access source code that requires debugging. The code contains at least one breakpoint where a developer wants the execution to halt in order to analyze the effects of execution up until the breakpoint. The human readable source code is converted into byte-code for execution. Every time the method executes a piece of byte-code pertaining to a line of human readable source code, information pertaining to changes in variable values, line numbers and stack information is recorded as execution data. In some embodiments, only values that change because of the execution of that line of human readable source code are stored, which minimizes memory usage. The method iterates executing byte-code and storing changes in data until the method reaches a breakpoint. At the breakpoint, all data currently available from the stack frame and all data previously collected during execution of the byte-code is gathered and sent to a debugger. The debugger analyzes the execution data and performs a code execution analysis. The code execution analysis combined with the information about which line numbers in the source code were actually executed, enable the debugger to determine the execution path that led to the breakpoint. Collected data and the source code surrounding the breakpoint are displayed in a graphical user interface (GUI). The source code is displayed in a source code display area of the GUI, a plurality of variables with their current values are displayed in a variable display area of the GUI and a history of a variable or a source code execution is displayed in a history display area of the GUI.

The method receives an input, for example, a user input via the GUI. The user input may be predefined to perform specific functions by the debugger. For example, when a line of source code is selected in the GUI, a user may input, for example, SHIFT+F5. An input of SHIFT+F5 causes the debugger to indicate the line of source code that was executed immediately prior to the selected line of source code. This indication may be done using a visual indicator, such as through highlighting in the source code display area of the GUI. In addition, all variables displayed in the area of the GUI are updated with the value of the variable at the new highlighted line of source code. This allows a user to step backwards through the execution flow to assist in debugging the code. When a line of source code is selected in the GUI and a user inputs a request for an analysis describing what caused the execution flow to arrive at this point in the source code, a report is generated and a listing of each line of source code that had an impact on execution up to the breakpoint is displayed in the history display area of the GUI. If a variable is selected in the GUI and a user inputs a request for how the variable acquired its current value, a report is generated and all changes in the value of the variable with a list of source code line numbers where the changes occurred is displayed in the history display area of the GUI. Such information may be used to facilitate identification of errors in the source code by allowing stepping back in the source code and providing analysis of what caused changes to a variable and the execution path.

Various embodiments of a method and apparatus for reverse debugging source code using causal analysis are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
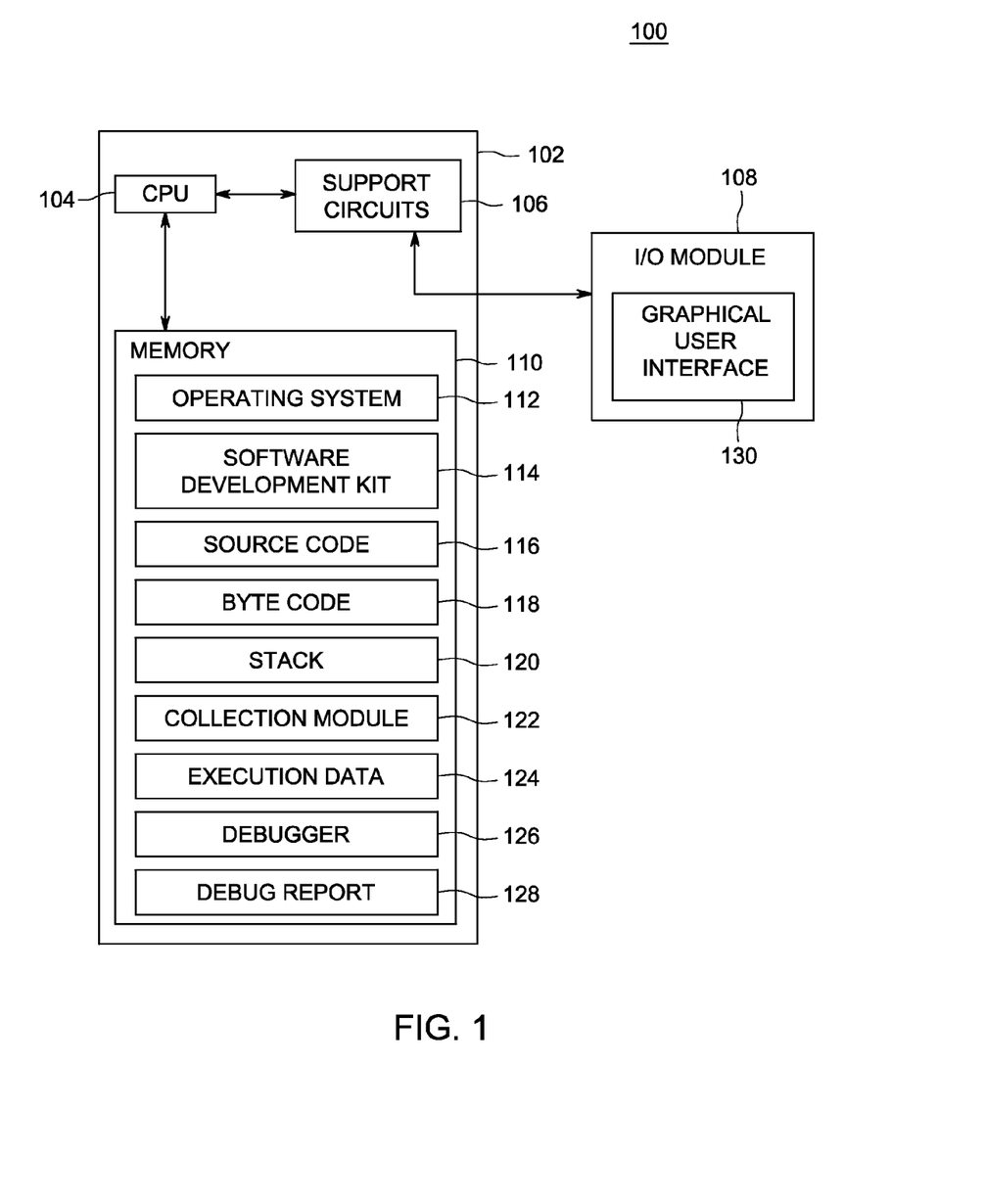
FIG. 1 depicts a block diagram of a computer system for reverse debugging source code using causal analysis, according to one or more embodiments of the invention.

FIG. 1 depicts a block diagram of a computer system 100 for reverse debugging of source code using causal analysis, according to one or more embodiments of the invention. Exemplary embodiments of the computer system 100 may include desktop computers, laptops, tablet computer, smart phones, personal digital assistants (PDAs), cellular phones, and the like. The computer system 100 comprises a CPU 104, support circuits 106, input/output (I/O) module 108, and a memory 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 110 comprises at least one of Read Only Memory (ROM), Random Access Memory (RAM), disk drive storage, optical storage, removable storage and/or the like. The I/O module 108 comprises a graphical user interface (GUI) 130.

The memory 110 comprises an operating system 112, a software development kit 114, source code 116, byte-code 118, a stack 120, a collection module 122, execution data 124, a debugger 126, and a debug report 128. The operating system 112 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, UNIX, Microsoft Windows, and the like. The software development kit 114 may be ADOBE® Flash Builder, provided by Adobe Systems, Inc., of San Jose, Calif. or any software development kit capable of providing tools to software developers for the creation of software application.

According to an embodiment, the software development kit 114 enables a developer to set one or more breakpoints in the source code 116 and provides an integrated development environment (IDE) for debugging the source code 116. A breakpoint is a place in the source code where a developer wishes code execution to halt in order to analyze the effects of execution up until the breakpoint. The software development kit 114 converts the source code 116 into byte-code 116 for execution. When the byte-code 116 is executed on the computing system 100, the collection module 122, collects data pertaining to changes in variables, line numbers, and the stack 120. The collected data is stored as execution data 124. The collection module 122 continues to collect data in this manner until arriving at a developer defined breakpoint. However, the execution may halt at an undefined breakpoint in the source code before execution reaches the developer defined breakpoint when, for example, an exception is generated. When arrival at a breakpoint occurs (either defined or undefined), the collection module 122 sends all collected execution data 124 to the debugger 126. The debugger 126 performs an analysis of the control flow, meaning the debugger 126 determines the execution path through the source code 116 that was taken to arrive at the breakpoint. When the debugger 126 completes the analysis, the debug report 128 is stored in memory 110. The debug report 128 is displayed on the graphical user interface (GUI) 130. A user may interact with the data via the GUI 130. Depending on the type of interaction, the debugger 126 responds with an appropriate debug report. The debug report 128 may be transferred via a network (not shown) or other transfer means and loaded onto another computer (not shown). The debug report contains all of the information needed in order to debug the source code 116 as it would be on the original computing system 100.

Figure 2:
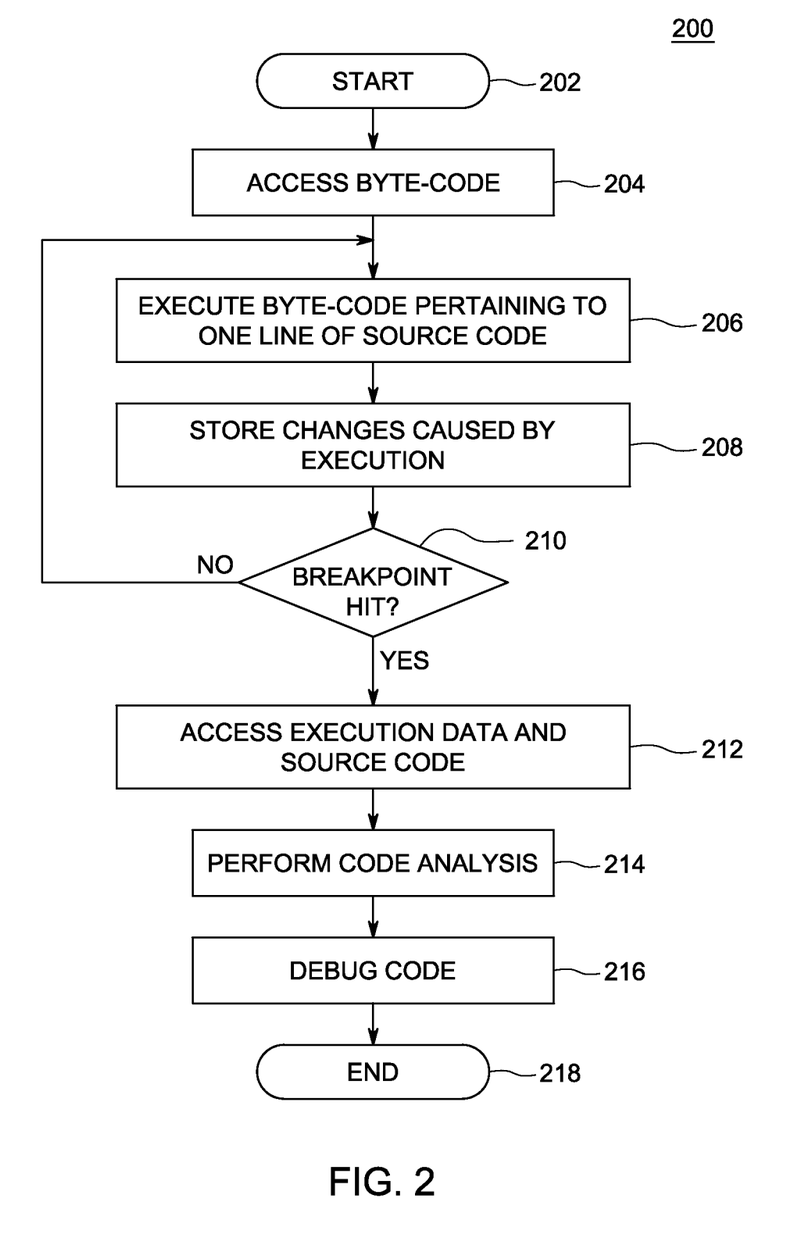
FIG. 2 depicts a flow diagram for a method for gathering code execution data, as performed by the collection module of FIG. 1, according to one or more embodiments of the invention.

FIG. 2 depicts a flow diagram for a method 200 for gathering code execution data, as performed by the collection module 122 of FIG. 1, according to one or more embodiments of the invention. The method 200 stores data at each step of the execution of the source code, including line number changes, variable value changes, and stack changes. The method 200 starts at step 202, and proceeds to step 204.

At step 204, the method 200 accesses byte-code created from source code that contains one or more breakpoints. A breakpoint is a place in the source code where a developer wishes execution to halt in order to analyze the effects of execution up until the breakpoint. However, the execution may halt at an undefined point in the source code before execution reaches the developer defined breakpoint when, for example, an exception is generated. The method 200 proceeds to step 206.

At step 206, the method 200 executes byte-code pertaining to one line of human readable source code. Byte-code is computer-readable code. There may be multiple lines of byte-code associated with one line of human readable source code. The method 200 proceeds to step 208. At step 208, the method 200 stores changes in variable values, line numbers, and stack information that occurred during the execution of the byte-code associated with the one line of human readable source code. Stack information is retrieved using a stack trace. A stack trace is a report of the active stack frames at a certain point in time during the execution of the code. The stack trace allows tracing of a sequence of nested functions called up to the point where the stack trace was generated. The stack frame at the top of the stack is for a currently executing routine. The stack frame includes arguments passed to the routine, a return address back to a caller of the routine, and any local variables of the routine. Any changes to this information since the execution of a previous line of human readable source code is stored as execution data. The method 200 proceeds to step 210.

At step 210, the method 200 determines whether execution has reached breakpoint in the source code. If execution has not reached a breakpoint, the method 200 proceeds to step 206 and iterates until execution of the source code reaches a breakpoint. If at step 210 the method 200 reaches a breakpoint, the method 200 proceeds to step 212.

At step 212, the method 200 accesses all execution data and the source code in order to prepare for code execution analysis. The method 200 proceeds to step 214.

At step 214, the method 200 performs a code execution analysis using the execution data. The method 200 analyzes the execution data and uses the data to determine the execution path that was taken in the source code. The method 200 performs the analysis by evaluating specific control statements in the source code, such as "if" statements, "switch" statements, and "while" statement, where, while in the control block of code, the stack was changed. The stack will have changed when, for example, a return statement executed, a method call occurred, an event had been dispatched, or an exception occurred. All lines of code that did not affect variables or the execution flow are filtered out in order to provide an analysis of how the breakpoint was reached.

The method 200 begins the code execution analysis for a current line of source code where the breakpoint occurred. For example, a class HeaderNewsRenderer may have a click event handler as follows:

```
protected function itemrenderer1_clickHandler(event:MouseEvent):void
{
    var art:ArticleVO = data as ArticleVO;
    if ( !art.text )
    {
        if (art.valid)
            art.valid = false;
        if (!checkIfArticleValid(art)) {
            return;
        }
    }
    else
    {
        mod.mainTextArticle = art;
    }
}
```

An inner method that is called from within the click event handler may be:

```
    private function checkIfArticleValid(art:ArticleVO):Boolean
    {
        var valid:Boolean = true;
        try {
            if (art != null) {
                var tags:Array = art.tags;
                var arttime:Number = art.time;
                var link:String = art.link;
                var deltatime:Number = (new Date( ).time −
arttime) / 1000;
                var date:String = new Date( ).toString( );
                date = deltatime.toString( );
                if (link.length <= 0)
                    valid = false;
                art.date = date;
                if (!valid) {
                    trace ("not valid");
                }
            }
            else
                valid = false;
        }
        catch (err:Error) {
            valid = false;
        }
        trace(valid);
        return valid;
    }
```

If, for example, a breakpoint is hit in the catch( ) block, the method 200 filters the stack trace by determining the following:
1. If the execution flow is in a catch block then add 'exception was thrown' to the analysis,
2. If the execution flow is in an if block, then add 'if succeeded' to the analysis,
3. If the execution flow is in an else block, then add 'else succeeded' to the analysis, 4. If the execution flow is in a switch block then add 'switch succeeded' to the analysis,
5. If the execution flow is in a while block then add 'while succeeded' to the analysis,
6. If the execution flow is in a for block, then add 'for succeeded' to the analysis,
7. If the stack now points to a different method then add 'method was called' to the analysis,
8. If the stack now points to an event handler then add 'event was dispatched' to the analysis.

The method 200 then looks at a stack trace for a line executed immediately previous to the current line of executed source coded. For each piece of data in the analysis, the method 200 determines if the analysis block pertains to "if", "else", "switch", "while", or "for". If the analysis block pertains to any of these, then for each stack trace data within the block, the method 200 determines whether the top of the stack ever changed due to a return, method call, event dispatch or exception. If the check failed, the method 200 removes this analysis block.

Once the code analysis is complete, the method 200 looks for false suspects such as the following block. The method 200 removes the block because the block does not affect the control flow that arrived at the breakpoint.

```
//in function itemrenderer1_clickHandler( )
  if (art.valid)
    art.valid=false;
```

The method 200 removes the block because the block does not affect the control flow that arrived at the breakpoint. Upon completion of the code execution analysis, the method 200 has determined each line of source code that was executed, the order in which the lines of source code were executed, the lines of source code that affected the value of every variable, and the value of each variable after each line of source code was executed. The method 200 stores all of this information in a debug report. The method 200 proceeds to step 216.

At step 216, the method 200 debugs the executed code as described in further detail with respect to FIG. 3 below. The method 200 proceeds to step 218 and ends.

Figure 3:
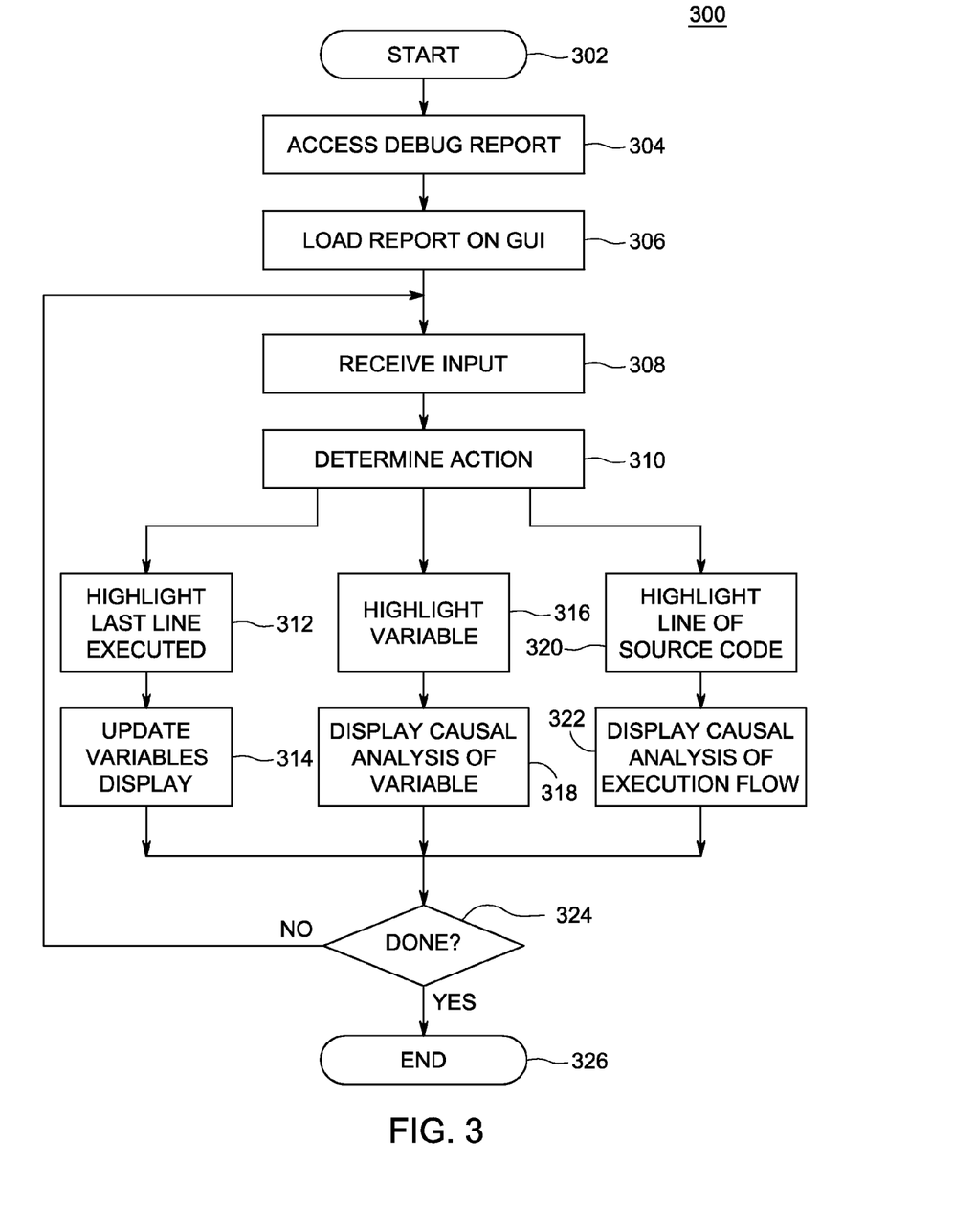
FIG. 3 depicts a flow diagram for a method for reverse debugging source code using causal analysis, as performed by the debugger of FIG. 1, according to one or more embodiments of the invention.

FIG. 3 depicts a flow diagram for a method 300 for reverse debugging of source code using causal analysis, as performed by the debugger 126 of FIG. 1, according to one or more embodiments of the invention. The method 300 displays the lines of source code surrounding and including the breakpoint. The method 300 performs an action in response to a user input via the GUI, wherein the action is a display of a causal analysis pertaining to an aspect of the source code. The method 300 starts at step 302, and proceeds to step 304.

At step 304, the method 300 accesses a debug report. In some embodiments, the debug report includes information regarding each line of source code that was executed, the order in which the lines of source code were executed, the lines of source code that affected the value of each variable, and the value of each variable after each line of source code was executed. The method 300 proceeds to step 306.

At step 306, the method 300 loads the debug report into the graphical user interface (GUI). The GUI comprises a plurality of display areas, as described in conjunction with FIG. 4 below. A source code display area displays the lines of source code. When the debug report is initially loaded into the GUI, the line of source code where the breakpoint occurred is highlighted. A variable display area displays a list of variables and the current value of each variable. A history display area displays only the lines of source code that affected the execution. The method 300 proceeds to step 308.

At step 308, the method 300 receives input via the GUI. The method 300 determines an action based on the user input. It is appreciated that although FIG. 3 illustrates three potential actions, other embodiments of the present disclosure envision additional possible actions.

In one embodiment, the method 300 determines a reverse stepping action and proceeds to step 312. When a line of source code is highlighted, a user may select a command that requests reverse stepping, for example, by performing a SHIFT+F5 action. When the user performs the SHIFT+F5 action, the method 300 highlights a line of source code that was the last line of source code executed before the currently highlighted line of source code. The method 300 proceeds to step 314, where the method 300 updates the value of each variable in the variable display area of the GUI to the value it possessed at the execution of this newly highlighted line of source code. A user may continue to request a trace to a next previous line of source code to see a reverse path of execution of the source code and the effect each of those lines of source code had on each variable.

In another embodiment, the method 300 determines a variable history request action and proceeds to step 316. A user may select, by highlighting or clicking, a variable in a line of source code in the source code display area of the GUI and request a history of the variable from, for example, a pull down menu. The method 300 highlights the variable in the variable display area of the GUI. The method 300 proceeds to step 318, where the method 300 displays a history of the variable in a history display area of the GUI. A history of the variable contains each line of code that affected a change in the variable from the most recent change to the variable and back to the creation of the variable. The history shows an analysis of which lines of source code caused the variable to reach its current value. For example, a history of a date variable may be:

At line 143, value was 35 weeks ago
At line 87, value was 21524514.974
At line 79, value was Tue May 8 20:03:25 GMT-F0530 2012
At line 77, variable was created In yet another embodiment, the method 300 determines an execution history request and proceeds to step 320. A user may highlight, click on, or select a line of source code in the source code display area of the GUI and request a report of the execution flow that led to the breakpoint. The method 300 displays the execution flow in reverse in the history display area of the GUI. The history shows an analysis of which lines of source code caused the execution flow to reach the current breakpoint. For example, a history of how the execution flow led from execution to line 130 may be:

At line 130: exception was generated
At line 68, if was successful: if(art !=null){
At line 33, method was called: if (checkIfArticleValid(art( )
At line 20, if was successful
At line 7, ExecuteApplication was clicked The method 300 proceeds to step 324. At step 324, the method 300 determines if the user is done debugging. If the user inputs a request, the method 300 proceeds to step 308 and continues to respond to user input via the GUI. If the user is done debugging, the method 300 proceeds to step 326 and ends.

Figure 4:
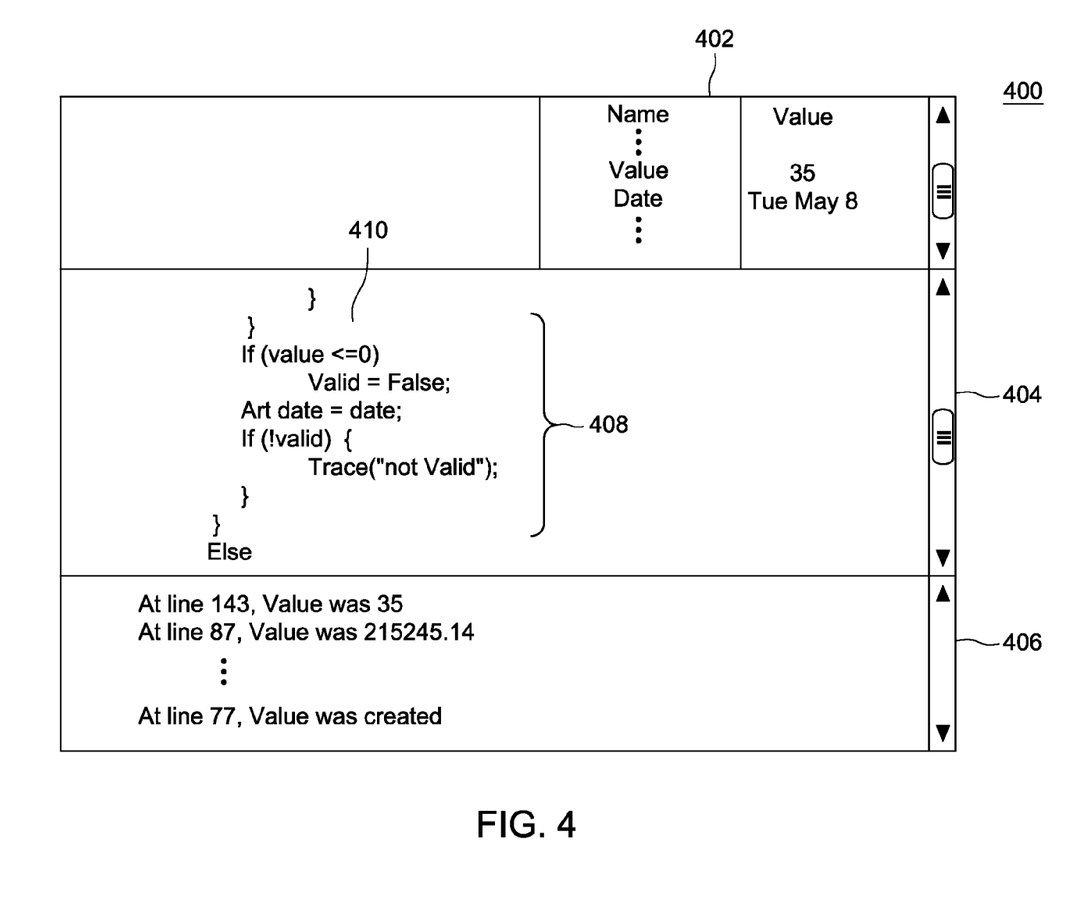
FIG. 4 illustrates a graphical user interface containing a display for debugging source code using causal analysis as performed by the system of FIG. 1, according to one or more embodiments of the invention.

FIG. 4 illustrates a graphical user interface (GUI) 400 containing a display for debugging source code using causal analysis as performed by the system 100 of FIG. 1, according to one or more embodiments of the invention.

The GUI 400 comprises a variable display area 402, a source code display area 404, and a history display area 406. The source code display area 404 contains a plurality of lines of source code 408. Initially, a line of source code 408 is highlighted in the GUI 400 where a breakpoint occurred. A list of variables, including variables related to that line of source code, will be displayed in the variable display area 402 along with the value possessed by each variable upon the execution of the highlighted line of source code 408. A user may debug the source code 408 in various ways as previously described. In the example illustrated in FIG. 4, a user has selected a variable 410 (such as by using a mouse click), namely "value". In response to the user input of clicking on "value", a history of the variable "value" is displayed in the history display area 406 of the GUI 400. The history area displays the current state of "value" and a history of each line of source code that altered "value" beginning, with the most recent line and ending with the line where the variable was created.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable source code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer source code for carrying out operations of the present invention may be written in an object oriented programming language, such as Java®, Smalltalk or C++, and the like. However, the computer source code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
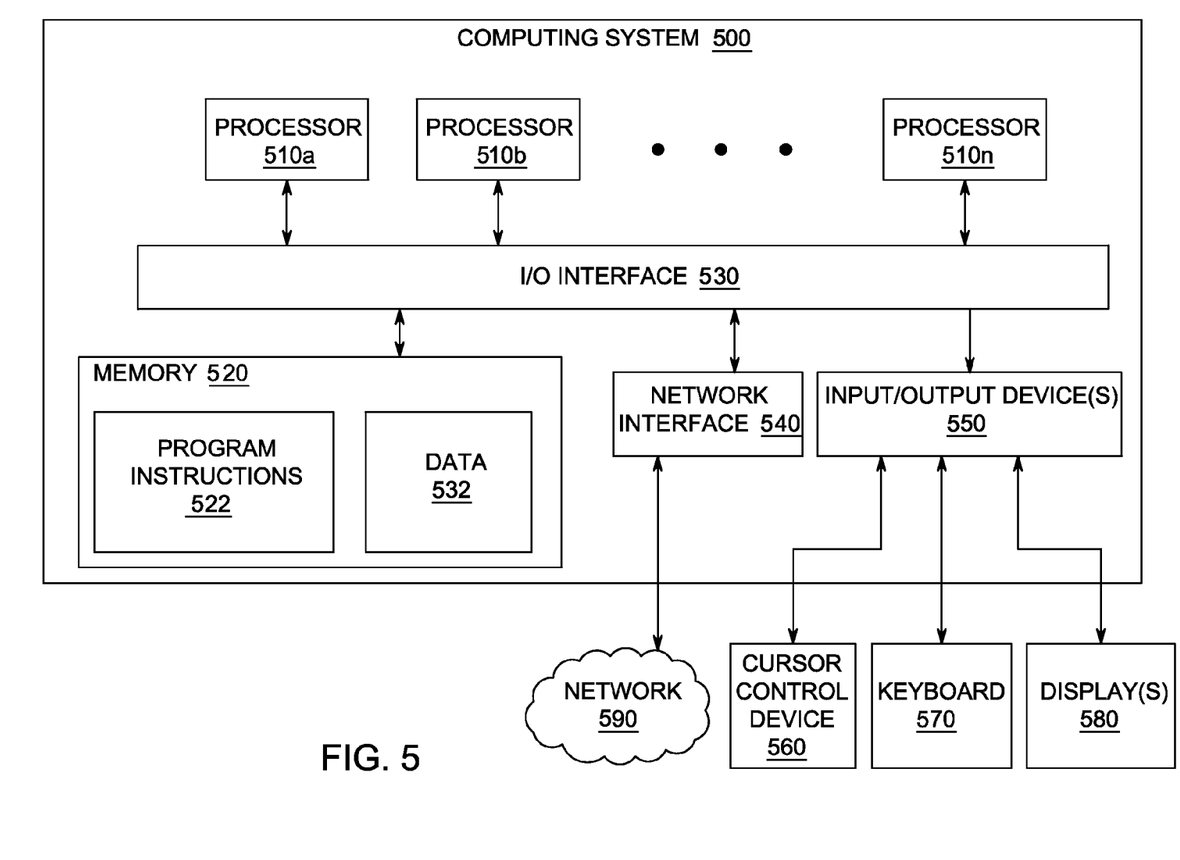
FIG. 5 depicts a computer system that can be utilized in various embodiments of the present invention, according to one or more embodiments of the invention.

FIG. 5 depicts a computer system that can be used to implement the methods of FIG. 2 and FIG. 3 in various embodiments of the present invention, according to one or more embodiments of the invention.

Various embodiments of method and apparatus for improving the adaptive bit rate behavior of a streaming media player, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 2 and FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for providing causal analysis of execution data via a software debugger comprising:
   executing byte-code created from a plurality of lines of source code, wherein the plurality of lines of source code comprise at least one breakpoint;
   identifying, for each executed line of source code in the plurality of lines of source code, one or more variables within the plurality of lines of source code that experience a change due to the execution of the line of source code just executed;
   storing execution data after execution of each line of source code in the plurality of lines of source code for the identified one or more variables until execution reaches the at least one breakpoint;
   performing, upon execution reaching the at least one breakpoint, a code execution analysis using the execution data and the plurality of lines of source code by:
      determining a history of the identified one or more variables from beginning of the executed byte-code through the at least one breakpoint, the history of the identified one or more variables comprising only lines of code that affect the identified one or more variables; and
      determining an execution flow history comprising the plurality of lines of source code that caused the execution data to arrive at the at least one breakpoint and filtering out all lines of source code that did not affect the execution data to arrive at the at least one breakpoint;
   receiving an input via a graphical user interface (GUI), wherein the input requests specific execution details based on the history of the identified one or more variables and the execution flow history; and
   responding via the GUI by providing the specific execution details based on the history of the identified one or more variables from the beginning of the executed byte-code through the at least one breakpoint.

2. The method of claim 1, wherein the execution data comprises a line number for each line of source code in the plurality of lines of source code that is executed, a value of the identified one or more variables that was changed by the execution of a line of source code, and a plurality of stack information that changed due to the execution of the line of source code.

3. The method of claim 1, wherein providing the history of the one or more identified variables and the execution flow history from the beginning of the executed byte-code through the at least one breakpoint comprises integrating the execution data and the plurality of lines of source code to create a debug report comprising:
   information regarding each line of source code that was executed;
   an order in which the lines of source code were executed;
   the lines of source code that affected a value of the identified one or more variables; and
   the value of the identified one or more variables after the each line of source code was executed.

4. The method of claim 3, wherein responding via the GUI further comprises providing on the GUI of at least one of: reverse stepping through the source code, the history of the identified one or more variables, or the execution flow history.

5. The method of claim 4, wherein providing the reverse stepping comprises highlighting a displayed line of source code that was executed immediately prior to a current line of source code and updating a display of the identified one or more variables with the value of the identified one or more variables after the execution of the highlighted line of source code and repeating until the current line of source code where the source code was executed is reached.

6. The method of claim 4, wherein providing the history of the identified one or more variables further comprises displaying a list comprising each line of source code in the plurality of lines of source code that affected the identified one or more variables and the value of the identified one or more variables after execution of each of the lines of source code in the plurality of lines of source code that affected the identified one or more variables.

7. The method of claim 4, wherein providing the execution flow history comprises displaying a list comprising only the plurality of lines of source code that were executed to cause the execution data to arrive at a line of source code last executed at the at least one breakpoint.

8. A non-transitory computer readable medium for debugging using information pertaining to execution of source code that, when executed by at least one processor cause the eat least one processor to perform a method for reverse debugging with causal analysis comprising:
   executing byte-code created from a plurality of lines of source code, wherein the plurality of lines of source code comprise at least one breakpoint;
   identifying, for each executed line of source code in the plurality of lines of source code, one or more variables within the plurality of lines of source code that experience a change due to the execution of the line of source code just executed;
   storing execution data after execution of each line of source code in the plurality of lines of source code for the identified one or more variables until execution reaches the at least one breakpoint;
   performing, upon execution reaching the at least one breakpoint, a code execution analysis using the execution data and the plurality of lines of source code by:
      determining a history of the identified one or more variables from beginning of the executed byte-code through the at least one breakpoint, the history of the identified one or more variables comprising only lines of code that affect the identified one or more variables; and determining an execution flow history comprising the plurality of lines of source code that caused the execution data to arrive at the at least one breakpoint and filtering out all lines of source code that did not affect the execution data to arrive at the at least one breakpoint;

receiving an input via a graphical user interface (GUI), wherein the input requests specific execution details based on the history of the identified one or more variables and the execution flow history; and responding via the GUI by providing the specific execution details based on the history of the identified one or more variables from the beginning of the executed byte-code through the at least one breakpoint.

9. The computer readable medium of claim 8, wherein the execution data comprises a line number for each line of source code in the plurality of lines of source code that is executed, a value of the identified one or more variables that was changed by the execution of a line of source code, and a plurality of stack information that changed due to the execution of the line of source code.

10. The computer readable medium of claim 8, wherein providing the history of the one or more identified variables and the execution flow history from the beginning of the executed byte-code through the at least one breakpoint comprises integrating the execution data and the plurality of lines of source code to create a debug report comprising:

information regarding each line of source code that was executed;

an order in which the lines of source code were executed;

the lines of source code that affected a value of the identified one or more variables; and the value of the identified one or more variables after the each line of source code was executed.

11. The computer readable medium of claim 8, wherein responding via the GUI further comprises displaying on the GUI of at least one of: reverse stepping through the source code, the history of the identified one or more variables, or the execution flow history.

12. A computer implemented method comprising:

providing a graphical user interface (GUI) for debugging a plurality of lines of source code;

displaying, within a first portion of the GUI, the plurality of lines of source code within the GUI, wherein the plurality of lines of source code comprise a plurality of variables;

receiving an indication of at least one breakpoint within the plurality of lines of source code;

executing byte-code created from a plurality of lines of source code;

identifying, for each executed line of source code in the plurality of lines of source code, one or more variables within the plurality of lines of source code that experience a change due to the execution of the line of source code just executed;

upon reaching the at least one breakpoint, performing a code execution analysis based on the execution of the byte-code by:

determining a history of the identified one or more variables from beginning of the executed byte-code through the at least one breakpoint, the history of the identified one or more variables comprising only lines of code that affect the identified one or more variables; and determining an execution flow history comprising the plurality of lines of source code that caused the execution data to arrive at the at least one breakpoint and filtering out all lines of source code that did not affect the execution data to arrive at the at least one breakpoint;

receiving, via the GUI an input, wherein the input requests specific execution details based on the history of the identified one or more variables and the execution flow history; and providing, via a second portion of the GUI and in response to the received input:

instances of the identified one or more variables in the plurality of lines of source code, and the history of the identified one or more variables and the execution flow history from the beginning of the executed byte-code through the at least one breakpoint.

13. The computer implemented method as recited in claim 12, wherein providing the history of the one or more identified variables and the execution flow history comprises integrating the plurality of lines of source code and execution data associated with the execution of the byte-code to create a debug report, the debug report comprising information regarding each line of source code that was executed, an order in which the lines of source code were executed, the lines of source code that affected a value of the identified one or more variables, and the value of the identified one or more variables after each line of source code was executed.

14. The computer implemented method as recited in claim 13, wherein the debug report further comprises a line number for each line of source code in the plurality of lines of source code that affected the value of the identified one or more variables and a plurality of stack information that changed by the execution of each line of source code.

15. The computer implemented method as recited in claim 12, further comprising providing reverse stepping through the source code, wherein providing reverse stepping comprises highlighting, within the first portion of the GUI, a displayed line of source code that was executed immediately prior to a current line of source code and updating a display of the identified one or more variables with the value of the identified one or more variables after the execution of the highlighted line of source code and repeating until the current line of source code associated with the beginning of the executed byte-code is reached.

16. The computer implemented method as recited in claim 12, wherein providing the history of the identified one or more variables comprises providing a list comprising each line of source code in the plurality of lines of source code that affected the identified one or more variables and the value of the identified one or more variables after execution of each of the lines of source code in the plurality of lines of source code that affected the identified one or more variables.

17. The computer implemented method as recited in claim 12, wherein providing the execution flow history comprises providing a list comprising only the plurality of lines of source code that were executed to cause the execution data to arrive at a line of source code last executed at the at least one breakpoint.

18. The computer implemented method as recited in claim 17, wherein providing the execution flow history further comprises displaying the plurality of lines of source code that caused the execution data to arrive at the at least one breakpoint in reverse.

19. The computer implemented method as recited in claim 12, wherein filtering out all lines of source code that did not affect the identified one or more variables or the execution data comprises:
- determining whether the execution data changed due to a return, method call, event dispatch, or exception in response to an "if" block, "else" block, "switch" block, "while" block, or "for" block;
- if the execution data did not change due to the return, method call, event dispatch, or exception in response to an "if" block, "else" block, "switch" block, "while" block, or "for" block, removing the "if" block, "else" block, "switch" block, "while" block, or "for" block; or
- if the execution data changed due to the return, method call, event dispatch, or exception in response to an "if" block, "else" block, "switch" block, "while" block, or "for" block, leaving the "if" block, "else" block, "switch" block, "while" block, or "for" block.

20. The computer implemented method as recited in claim 12, wherein the identified one or more variables are a specific variable selected based on input provided by a user.

* * * * *